US012730898B2

(12) United States Patent
Srivastava et al.

(10) Patent No.: US 12,730,898 B2
(45) Date of Patent: Sep. 8, 2026

(54) TESTING OF SECURITY SYSTEMS IN INTEGRATED CIRCUITS

(71) Applicant: NXP B.V., Eindhoven (NL)

(72) Inventors: Neha Srivastava, New Delhi (IN); Gautam Tikoo, Noida (IN)

(73) Assignee: NXP B.V., Eindhoven (NL)

( * ) Notice: Subject to any disclaimer, the term of this patent is extended or adjusted under 35 U.S.C. 154(b) by 479 days.

(21) Appl. No.: 18/152,809

(22) Filed: Jan. 11, 2023

(65) Prior Publication Data

US 2024/0160745 A1 May 16, 2024

(30) Foreign Application Priority Data

Nov. 16, 2022 (IN) ............................ 202221065531

(51) Int. Cl.

| | |
|---|---|
| ***G06F 21/57*** | (2013.01) |
| ***G01R 31/28*** | (2006.01) |
| ***G06F 11/27*** | (2006.01) |
| ***G06F 21/62*** | (2013.01) |
| ***G06F 21/72*** | (2013.01) |

(52) U.S. Cl.

CPC ....... *G06F 21/577* (2013.01); *G01R 31/2851* (2013.01); *G06F 11/27* (2013.01); *G06F 21/6218* (2013.01); *G06F 21/72* (2013.01); *G06F 2221/034* (2013.01)

(58) Field of Classification Search

None

See application file for complete search history.

(56) References Cited

U.S. PATENT DOCUMENTS

| | | | |
|---|---|---|---|
| 5,239,262 | A | 8/1993 | Grutzner et al. |
| 5,554,941 | A | 9/1996 | Kesel |
| 5,655,071 | A | 8/1997 | Habbe et al. |
| 6,510,530 | B1 | 1/2003 | Wu et al. |
| 6,701,476 | B2 | 3/2004 | Pouya et al. |
| 7,594,206 | B2 | 9/2009 | Yoshida et al. |
| 7,757,133 | B1 | 7/2010 | Parulkar |
| 7,818,645 | B2 | 10/2010 | Gedamu et al. |
| 7,840,865 | B2 | 11/2010 | Lai et al. |

(Continued)

FOREIGN PATENT DOCUMENTS

| | | | |
|---|---|---|---|
| CN | 109870463 | A | 1/2020 |
| CN | 111337780 | A | 6/2020 |
| RU | 2725783 | C1 | 7/2020 |

*Primary Examiner* — Ario Etienne
*Assistant Examiner* — Mohammad Yousuf A. Mian

(57) ABSTRACT

An integrated circuit includes a secure asset, a security system, and an efficacy decoder. The security system is triggered to operate in one of its functional states. Further, the security system receives various test requests for an access to the secure asset, and determines, based on the triggered functional state thereof, one or more test requests authorized to access the secure asset. The efficacy decoder similarly receives the test requests and determines one or more allowable requests for the triggered functional state of the security system. Further, the efficacy decoder determines an efficacy value for the security system based on a comparison between the test requests authorized by the security system and the allowable requests associated with the triggered functional state. The efficacy value is indicative of a security level of the security system operating in the triggered functional state.

6 Claims, 4 Drawing Sheets

(56) References Cited

U.S. PATENT DOCUMENTS

| | | | | |
|---|---|---|---|---|
| 8,736,299 | B1 * | 5/2014 | Pedersen | G06F 21/76 326/38 |
| 8,769,355 | B2 | 7/2014 | Scott et al. | |
| 10,495,691 | B2 | 12/2019 | Sun et al. | |
| 10,585,738 | B2 | 3/2020 | Marinet et al. | |
| 11,165,783 | B1 * | 11/2021 | Eiers | G06F 9/4498 |
| 2008/0022396 | A1 * | 1/2008 | Kado | G06F 12/1441 726/19 |
| 2014/0140512 | A1 * | 5/2014 | Hadley | H04L 9/088 380/277 |
| 2014/0230055 | A1 | 8/2014 | Boehl | |
| 2018/0137309 | A1 | 5/2018 | Shapira et al. | |
| 2019/0033374 | A1 * | 1/2019 | Bhagwat | G01R 31/31701 |
| 2019/0268382 | A1 | 8/2019 | Hu et al. | |

* cited by examiner

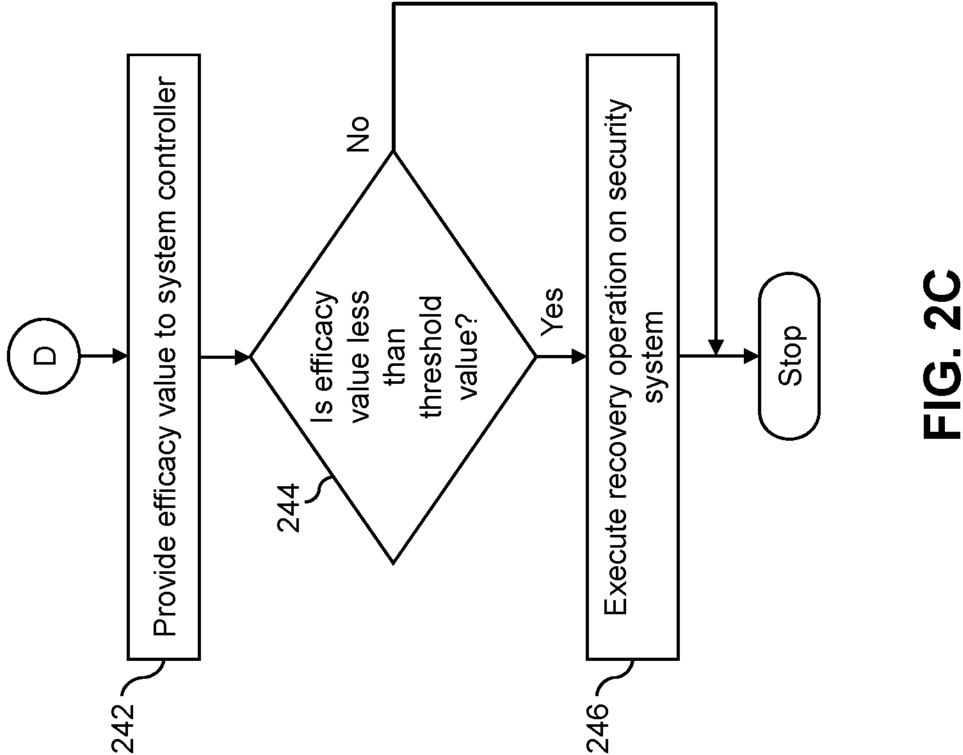
FIG. 2C

TESTING OF SECURITY SYSTEMS IN INTEGRATED CIRCUITS

FIELD OF THE DISCLOSURE

The present disclosure relates generally to electronic circuits, and, more particularly, to testing of security systems in integrated circuits.

BACKGROUND

Typically, an integrated circuit (IC) includes various secure assets that are critical for its operation. An example of a secure asset may be a secure memory that stores security data (e.g., cryptographic keys). Unauthorized access to the secure assets may compromise the secure assets (e.g., corrupt the security data), and in turn, may result in security threats to the IC.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 2A-2C, collectively, represents a flowchart that illustrates a testing method of a security system of the IC of FIG. 1 in accordance with an embodiment of the present disclosure.

DETAILED DESCRIPTION OF EMBODIMENTS

Figure 1:
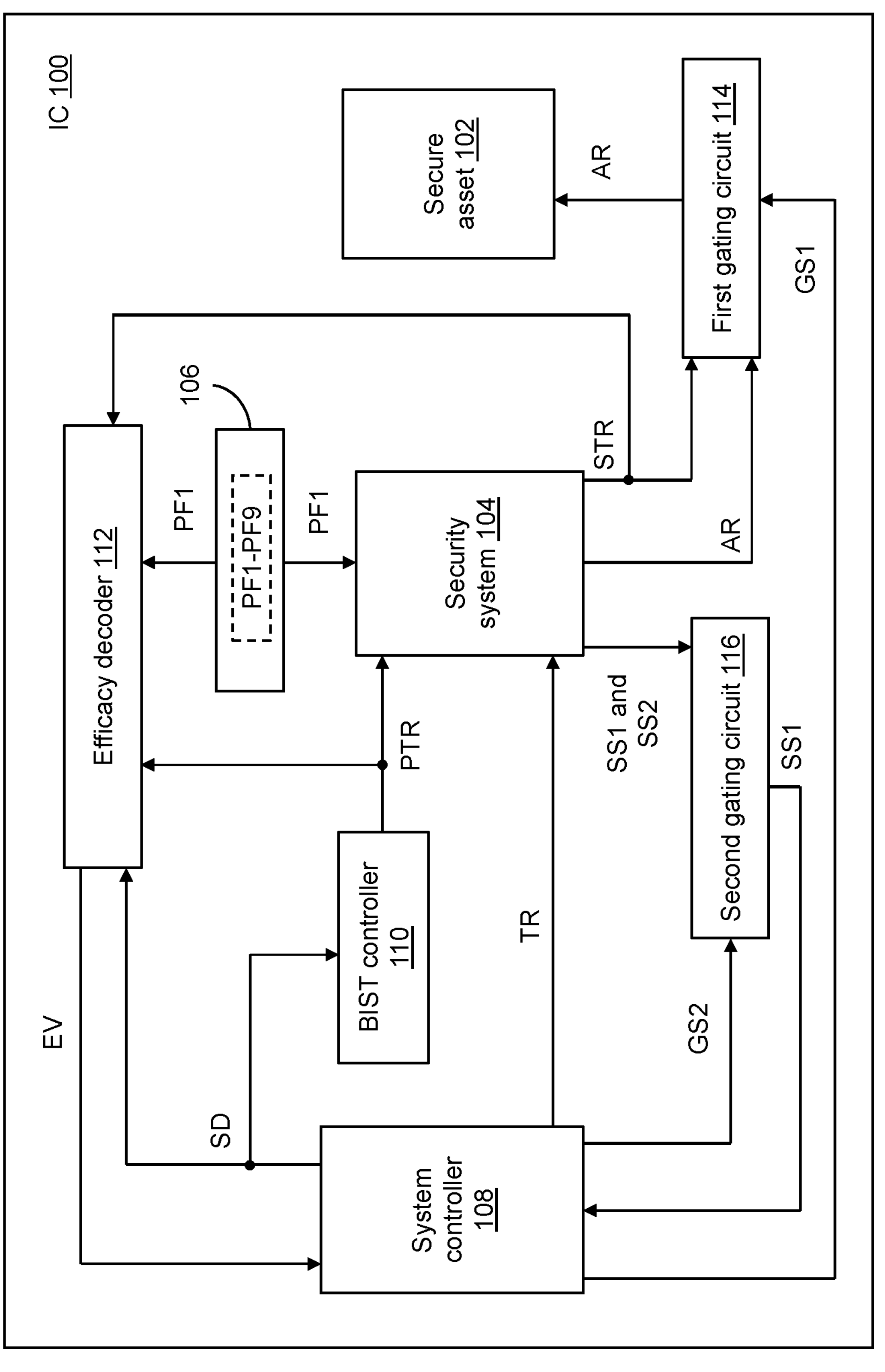
FIG. 1 illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, an integrated circuit (IC) is disclosed. The IC may include a secure asset, a security system coupled to the secure asset, and an efficacy decoder coupled to the security system. The security system may be configured to receive a plurality of test requests for an access to the secure asset. From the plurality of test requests, the security system may be further configured to determine, based on a first functional state thereof, a set of test requests that is authorized to access the secure asset. Further, the efficacy decoder may be configured to determine a set of allowable requests associated with the first functional state. The efficacy decoder may be further configured to determine an efficacy value for the security system based on a comparison between the set of test requests and the set of allowable requests. The efficacy value is indicative of a security level of the security system operating in the first functional state.

In another embodiment of the present disclosure, a testing method is disclosed. The testing method may include receiving a plurality of test requests for an access to a secure asset by a security system. The testing method may further include determining, by the security system, from the plurality of test requests, a set of test requests that is authorized to access the secure asset. The set of test requests is determined based on a first functional state of the security system. Further, the testing method may include determining a set of allowable requests associated with the first functional state by an efficacy decoder. The testing method may further include determining an efficacy value for the security system by the efficacy decoder based on a comparison between the set of test requests and the set of allowable requests. The efficacy value is indicative of a security level of the security system operating in the first functional state.

In some embodiments, the security system may be further configured to receive a trigger signal indicative of the first functional state and operate, based on the trigger signal, in the first functional state.

In some embodiments, the IC may further include a system controller that may be coupled to the security system. To determine the security level of the security system in the first functional state, the system controller may be configured to generate the trigger signal and provide the trigger signal to the security system to trigger the security system to operate in the first functional state.

In some embodiments, the IC may further include a memory that may be coupled to the efficacy decoder and the security system. The memory may be configured to store a plurality of policy files associated with a plurality of functional states of the security system. The access to the secure asset in each functional state of the plurality of functional states is authorized based on a corresponding policy file of the plurality of policy files.

In some embodiments, the security system may be further configured to identify, from the plurality of policy files, a first policy file associated with the first functional state and retrieve the first policy file from the memory. The security system may determine the set of test requests authorized to access the secure asset from the plurality of test requests based on the first policy file.

In some embodiments, the efficacy decoder may be further configured to receive the plurality of test requests and state data indicative of the security system operating in the first functional state. The efficacy decoder may be further configured to identify, from the plurality of policy files, a first policy file associated with the first functional state and retrieve the first policy file from the memory. The efficacy decoder may determine the set of allowable requests from the plurality of test requests based on the first policy file.

In some embodiments, the IC may further include a system controller that may be coupled to the efficacy decoder. The system controller may be configured to generate the state data based on the triggering of the security system to operate in the first functional state and provide the state data to the efficacy decoder.

In some embodiments, each of the plurality of test requests may include a plurality of test variables. Each variable of the plurality of test variables may be indicative of at least one of a group consisting of an IC lifecycle parameter, a password parameter, a debug authentication parameter, and a fuse state parameter.

In some embodiments, each test request of the set of test requests may include a plurality of test variables. The plurality of test variables of each of the set of test requests are generated based on a configuration of the IC. The efficacy decoder may be further configured to compare the plurality of test variables of each of the set of test requests with a plurality of allowable variables of each of the set of allowable requests. Further, the efficacy value may be determined based on the comparison between the plurality of test variables of each of the set of test requests and the plurality of allowable variables of each of the set of allowable requests.

In some embodiments, the secure asset may correspond to a secure memory configured to store security data. The access to the secure asset may correspond to an access to the security data stored in the secure memory.

In some embodiments, the IC may further include a built-in self-test (BIST) controller that may be coupled to the security system. The BIST controller may be configured to receive state data indicative of the security system operating in the first functional state. The BIST controller may be further configured to generate, based on the state data and a configuration of the IC, the plurality of test requests to determine the security level of the security system in the first functional state and provide the plurality of test requests to the security system.

In some embodiments, the IC may further include a system controller that may be coupled to the BIST controller. The system controller may be configured to generate the state data based on triggering of the security system to operate in the first functional state and provide the state data to the BIST controller.

In some embodiments, the IC may further include a system controller that may be coupled to the efficacy decoder. The system controller may be configured to receive the efficacy value from the efficacy decoder. The system controller may be further configured to compare the efficacy value with a threshold value and execute, based on the comparison between the efficacy value and the threshold value, a recovery operation for the security system.

In some embodiments, the IC may further include a first gating circuit that may be coupled to the security system and the secure asset. The first gating circuit may be configured to receive the set of test requests from the security system and gate the set of test requests, thereby preventing the access to the secure asset. The first gating circuit may gate the access to the secure asset based on the security system being triggered to operate in the first functional state.

In some embodiments, the IC may further include a second gating circuit that may be coupled to the security system. The security system may be further configured to generate a status signal indicative of a health status thereof. Further, the second gating circuit may be configured to receive the status signal from the security system and gate the status signal based on the security system being triggered to operate in the first functional state.

Overview

Conventionally, to prevent unauthorized access to a secure asset of an integrated circuit (IC), a security system is utilized. The security system may control access to the secure asset such that the access is granted exclusively to an authorized functional circuit of the IC. However, the efficacy of the security system may degrade in runtime due to various factors such as prolonged use, incompatible configurations of the IC, attacks, or the like. Such a security system may lead to an undesired scenario of an unauthorized functional circuit of the IC being granted access to the secure asset. Thus, inefficient management of the security system may compromise the secure asset and the security threats to the IC may persist. Consequently, the reliability of the IC may degrade.

Various embodiments of the present disclosure disclose an IC that may include a secure asset, a security system, and an efficacy decoder. The security system may be triggered to operate in one of its functional states. Further, the security system may receive a plurality of test requests for an access to the secure asset. From the plurality of test requests, the security system may determine a set of test requests that is authorized to access the secure asset based on the triggered functional state in which the security system is operating. The efficacy decoder may similarly receive the plurality of test requests and determine, from the plurality of test requests, a set of allowable requests for the triggered functional state of the security system. The efficacy decoder may further determine an efficacy value for the security system based on a comparison between the set of test requests and the set of allowable requests. The efficacy value may be indicative of a security level of the security system operating in the first functional state. Thus, the set of test requests corresponds to requests that the security system is authorizing for access to the secure asset based on a current security level of the security system, whereas the set of allowable requests corresponds to requests that may be authorized if the security system is operating in a desired manner (e.g., at the highest security level). Hence, the efficacy value may be highest when the set of test requests matches the set of allowable requests. Conversely, a lower efficacy value (e.g., below a threshold value) may indicate that the security system is compromised and various recovery operations may be performed to recover the security system.

Thus, in the present disclosure, the security system is tested to monitor the security level thereof and various recovery operations may be performed on the security system to maintain the security level (e.g., the efficacy value) of the security system within a desired range during the runtime. As a result, unauthorized access to the secure asset may be prevented. The security threats to the IC of the present disclosure are thus significantly less than that to an IC including a conventional security system. Consequently, the reliability of the IC of the present disclosure is significantly greater than that of the IC including the conventional security system.

FIG. 1 illustrates a schematic block diagram of an integrated circuit (IC) 100 in accordance with an embodiment of the present disclosure. The IC 100 may include a secure asset 102.

The secure asset 102 may correspond to any component of the IC 100 that is critical to an operation of the IC 100. The access to the secure asset 102 may be controlled to prevent any unauthorized access. In the present disclosure, the secure asset 102 may correspond to a secure memory that may be configured to store security data (e.g., cryptographic keys). In such a scenario, the access to the secure asset 102 may correspond to an access to the security data stored in the secure memory. For example, the security data may be accessed by authorized functional circuits (not shown) of the IC 100 to perform various functions thereof. Unauthorized access to the secure memory (e.g., utilization of the security data by unauthorized functional circuits (not shown) of the IC 100) may be indicative of an attack on the IC 100 or malfunction of one or more components of the IC 100, which in turn, may degrade the reliability of the IC 100.

The scope of the present disclosure is not limited to the secure memory being the secure asset 102. In various embodiments, the secure asset 102 may correspond to various other critical components of the IC 100 (e.g., functional systems such as cryptographic acceleration and assurance module), without deviating from the scope of the present disclosure.

The IC 100 may further include a security system 104 that may be coupled to the secure asset 102. The security system 104 may include suitable circuitry that may be configured to perform one or more operations. For example, the security system 104 may be configured to control the access to the secure asset 102. The security system 104 is required to ensure that exclusively the authorized functional circuits are granted access to the secure asset 102. Thus, the security system 104 may correspond to a countermeasure feature of the IC 100.

During normal operations, the security system 104 may be configured to receive various access requests from various functional circuits of the IC 100. The reception of the access requests is not illustrated in FIG. 1 to make the illustration concise and clear. From the received access requests, the security system 104 may be further configured to determine one or more access requests AR authorized for access to the secure asset 102 based on a current functional state thereof. The authorized one or more access requests AR may be provided to the secure asset 102 for execution thereon. In other words, the security system 104 may grant one or more functional circuits access to the secure asset 102 based on the current functional state thereof. Authorization criteria may vary based on various factors such as a current stage in the lifecycle of the IC 100, the criticality level of the secure asset 102, or the like. The current functional state of the security system 104 may be indicative of the aforementioned factors, and hence, may govern the authorization criteria for access to the secure asset 102. The security system 104 may include various registers (not shown), and the values of the registers may indicate the current functional state of the security system 104. Additionally, during normal operations, the security system 104 may be configured to generate a first status signal SS1 indicative of a health status thereof.

As the security system 104 controls the access to a critical component (e.g., the secure asset 102) of the IC 100, it is important to ensure that the security system 104 is operating in a desired manner. Hence, in the present disclosure, the security system 104 is tested to determine the security level thereof. The testing of the security system 104 corresponds to triggering the security system 104 to operate in various functional states and determining whether the security system 104 is operating in the desired manner (e.g., is granting access exclusively to desired functional circuits) in each functional state.

The IC 100 may further include a memory 106, a system controller 108, a built-in self-test (BIST) controller 110, an efficacy decoder 112, a first gating circuit 114, and a second gating circuit 116. Each of the aforementioned components may facilitate the testing of the security system 104.

The memory 106 may include suitable circuitry that may be configured to perform one or more operations. For example, the memory 106 may be configured to store a plurality of policy files. The security system 104 may operate in one of a plurality of functional states. The plurality of policy files may be associated with the plurality of functional states of the security system 104. Access to the secure asset 102 in each functional state of the plurality of functional states may be authorized based on a corresponding policy file of the plurality of policy files. For the sake of ongoing discussion, it is assumed that the plurality of functional states may include first through ninth functional states. However, in various other embodiments, the plurality of functional states may include more than or less than nine functional states. Further, for the first through ninth functional states, the plurality of policy files may include first through ninth policy files PF1-PF9, respectively. Hereinafter, the plurality of policy files may be referred to as the "plurality of policy files PF1-PF9".

The system controller 108 may be coupled to the security system 104. The system controller 108 may include suitable circuitry that may be configured to perform one or more operations. For example, the system controller 108 may be configured to trigger the testing of the security system 104. The triggering of the testing of the security system 104 may correspond to triggering the security system 104 to operate in one functional state (e.g., a first functional state) of the plurality of functional states. To trigger the testing of the security system 104 (e.g., to determine a security level of the security system 104 in the first functional state), the system controller 108 may be further configured to generate a trigger signal TR and provide the trigger signal TR to the security system 104 to trigger the security system 104 to operate in the first functional state. Further, based on the triggering of the security system 104 to operate in the first functional state, the system controller 108 may be configured to generate state data SD. The state data SD may thus be indicative of the security system 104 operating in the first functional state. The system controller 108 may be further coupled to the BIST controller 110 and the efficacy decoder 112, and configured to provide the state data SD to the BIST controller 110 and the efficacy decoder 112 to facilitate various operations thereof.

As the security system 104 is to be tested, the outputs of the security system 104 are required to be gated to prevent an undesired reaction in the IC 100. Hence, the system controller 108 may be further configured to generate various gating signals (e.g., a first gating signal GS1 and a second gating signal GS2) to gate various outputs of the security system 104 (e.g., authorized access requests and current status of the security system 104, respectively).

In response to the trigger signal TR, the system controller 108 may be further configured to receive an efficacy value EV indicative of the security level of the security system 104 operating in the first functional state. The system controller 108 may be further configured to compare the efficacy value EV with a threshold value (not shown). The threshold value may be stored in a buffer (not shown) associated with the system controller 108, and the system controller 108 may be configured to retrieve the threshold value from the buffer to perform the comparison operation.

When the efficacy value EV is greater than or equal to the threshold value, the security system 104 may continue the operation without interruption. When the efficacy value EV is less than the threshold value, the system controller 108 may determine that the security system 104 is compromised, and a recovery operation is required to be executed to recover the security system 104. Thus, based on the comparison between the efficacy value EV and the threshold value, the system controller 108 may be further configured to execute the recovery operation for the security system 104. The recovery operation may correspond to a reset of the security system 104, a reset of a subsystem including the security system 104, a reset of the IC 100, or the like. The system controller 108 may execute the recovery of the security system 104 in a graded manner (e.g., with increasing severity). Further, if the system controller 108 is unable to recover the security system 104, the security system 104 may be disabled to prevent the secure asset 102 from being compromised. Additionally, the efficacy value EV may be further utilized to predict a failure of the security system 104.

The BIST controller 110 may be coupled to the system controller 108 and the security system 104. The BIST controller 110 may include suitable circuitry that may be configured to perform one or more operations. For example, the BIST controller 110 may be configured to receive the state data SD from the system controller 108. Based on the state data SD and a configuration (e.g., a state of a plurality of hardware pins and a plurality of core systems) of the IC 100, the BIST controller 110 may be further configured to generate a plurality of test requests PTR. The plurality of test requests PTR may be generated to exhaustively test the security system 104 (e.g., to determine the security level of the security system 104) in the first functional state.

The plurality of test requests PTR may correspond to various features, factors, settings, or the like, that the security system 104 operating in the first functional state may be required to evaluate before granting access to the secure asset 102. The plurality of test requests PTR may include a plurality of test variables, with each test variable being generated based on the configuration of the IC 100. In an embodiment, each test variable is indicative of an IC lifecycle parameter, a password parameter, a debug authentication parameter, a fuse state parameter, or a combination thereof. The IC lifecycle parameter may indicate a stage in the lifecycle of the IC 100. The password parameter may be indicative of an authentication value set to access the secure asset 102. The debug authentication parameter may be indicative of authorization for debugging the secure asset 102. Further, the fuse state parameter may indicate a type of flash (e.g., a quad flash, a hyper flash, or an octal flash) in the IC 100. Each variable of the plurality of test variables may have one or more values. Further, each test request of the plurality of test requests PTR may include a unique combination of variable values. Each combination is indicative of various functional factors that the security system 104 evaluates before granting access to the secure asset 102. The plurality of test requests PTR may be generated to perform exhaustive testing of the security system 104. Thus, the plurality of test requests PTR may include various types of accesses such as secured, unsecured, privileged, nonprivileged, or the like. Further, the BIST controller 110 may be configured to provide the plurality of test requests PTR to the security system 104.

The scope of the present disclosure is not limited to the plurality of test requests PTR including the aforementioned test variables. In other embodiments, the plurality of test variables may include various other parameters generated based on the configuration of the IC 100, without deviating from the scope of the present disclosure.

The security system 104 may be coupled to the memory 106, the system controller 108, the BIST controller 110, the efficacy decoder 112, the first gating circuit 114, and the second gating circuit 116. The security system 104 may be further configured to receive the trigger signal TR indicative of the first functional state from the system controller 108. Based on the trigger signal TR, the security system 104 may be further configured to operate in the first functional state. For example, based on the trigger signal TR, one or more registers of the security system 104 may be updated to values associated with the first functional state. The first functional state governs the authorization criteria for the security system 104.

The security system 104 may be further configured to receive the plurality of test requests PTR from the BIST controller 110. The plurality of test requests PTR may be generated for the access to the secure asset 102. From the plurality of test requests PTR, the security system 104 may be further configured to determine, based on the first functional state thereof, a set of test requests STR that is authorized to access the secure asset 102. To determine the set of test requests STR, the security system 104 may execute various operations. For example, the security system 104 may be further configured to identify, from the plurality of policy files PF1-PF9 stored in the memory 106, a first policy file PF1 associated with the first functional state. Further, the security system 104 may be configured to retrieve the first policy file PF1 from the memory 106. The first policy file PF1 may indicate an allowable value for each test variable of the plurality of test variables. The security system 104 determines the set of test requests STR authorized for access to the secure asset 102 based on the first policy file PF1.

The security system 104 may be further configured to generate a second status signal SS2 indicative of a health status thereof during the testing. Determination of the health status of the security system 104 may include, for example, the detection of a failure of operation of the security system 104, the detection of a malicious access request that may result in a degraded performance of the security system 104, or the like.

The first gating circuit 114 may be coupled between the security system 104 and the secure asset 102. In other words, the security system 104 is coupled to the secure asset 102 by way of the first gating circuit 114. Further, the first gating circuit 114 may be coupled to the system controller 108. The first gating circuit 114 may include suitable circuitry that may be configured to perform one or more operations. For example, the first gating circuit 114 may be configured to receive the first gating signal GS1 from the system controller 108 and various requests (e.g., the set of test requests STR and the one or more access requests AR) from the security system 104. In an embodiment, the first gating circuit 114 corresponds to a switch and the first gating signal GS1 may control the operation of the first gating circuit 114. For example, when the first gating signal GS1 is at a logic low state, the first gating circuit 114 is deactivated (e.g., the switch is closed) and may be configured to provide the received requests to the secure asset 102. Conversely, when the first gating signal GS1 is at a logic high state, the first gating circuit 114 is activated (e.g., the switch is open) and may be configured to execute a gating operation (e.g., the received requests are not provided to the secure asset 102).

During normal operations, the first gating circuit 114 may receive the one or more access requests AR from the security system 104 and the first gating signal GS1 may be at a logic low state. Hence, the first gating circuit 114 may provide the one or more access requests AR to the secure asset 102. When the system controller 108 triggers the testing of the security system 104, the first gating signal GS1 transitions to a logic high state. The logic high state of the first gating signal GS1 may indicate that the security system 104 is triggered to operate in the first functional state. Thus, when the first gating circuit 114 receives the set of test requests STR from the security system 104, the first gating circuit 114 may be further configured to gate the set of test requests STR, thereby preventing the access to the secure asset 102. As the set of test requests STR is associated with the testing of the security system 104, the set of test requests STR is gated to avoid compromising the secure asset 102. The first gating circuit 114 thus gates the access to the secure asset 102 based on the security system 104 being triggered to operate in the first functional state.

The second gating circuit 116 may be coupled to the system controller 108 and the security system 104. The second gating circuit 116 may include suitable circuitry that may be configured to perform one or more operations. For example, the second gating circuit 116 may be configured to receive the second gating signal GS2 from the system controller 108 and various status signals (e.g., the first status signal SS1 and the second status signal SS2) from the security system 104. In an embodiment, the second gating circuit 116 corresponds to a switch and the second gating signal GS2 may control the operation of the second gating circuit 116. For example, when the second gating signal GS2 is at a logic low state, the second gating circuit 116 is deactivated (e.g., the switch is closed) and may be configured to provide the received status signals (e.g., the first status signal SS1) to the system controller 108. The system controller 108 may execute various operations based on the received status signals. Conversely, when the second gating signal GS2 is at a logic high state, the second gating circuit 116 is activated (e.g., the switch is open) and may be configured to execute a gating operation (e.g., the received status signals are not provided to the system controller 108).

During normal operations, the second gating circuit 116 may be configured to receive the first status signal SS1 from the security system 104 and the second gating signal GS2 may be at a logic low state. Hence, the second gating circuit 116 may provide the first status signal SS1 to the system controller 108. When the system controller 108 triggers the testing of the security system 104, the second gating signal GS2 transitions to a logic high state. The logic high state of the second gating signal GS2 may indicate that the security system 104 is triggered to operate in the first functional state. Thus, when the second gating circuit 116 receives the second status signal SS2 from the security system 104, the second gating circuit 116 may be further configured to gate the second status signal SS2. As the second status signal SS2 is associated with the testing of the security system 104, the second status signal SS2 is gated to avoid undesired reactions in the IC 100. The second gating circuit 116 thus gates the second status signal SS2 based on the security system 104 being triggered to operate in the first functional state.

The efficacy decoder 112 may be coupled to the system controller 108, the security system 104, the BIST controller 110, and the memory 106. The efficacy decoder 112 may include suitable circuitry that may be configured to perform one or more operations. For example, the efficacy decoder 112 may be configured to receive the state data SD from the system controller 108. Based on the state data SD, the efficacy decoder 112 may determine that the security system 104 is operating in the first functional state. Further, the efficacy decoder 112 may be configured to identify, from the plurality of policy files PF1-PF9 stored in the memory 106, the first policy file PF1 associated with the first functional state of the security system 104 and retrieve the first policy file PF1 from the memory 106.

The efficacy decoder 112 may be further configured to receive the plurality of test requests PTR from the BIST controller 110 that are generated to test the security system 104 in the first functional state. From the plurality of test requests PTR, the efficacy decoder 112 may be further configured to determine, based on the first policy file PF1, a set of allowable requests (not shown) for the first functional state. The set of allowable requests corresponds to the requests that have the access to the secure asset 102 when the security system 104 is operating in the first functional state. In other words, the set of allowable requests may correspond to requests where each variable includes the allowable value as determined by the first policy file PF1. Thus, each allowable request includes a plurality of allowable variables. In some embodiments, exclusively the privileged and secured types of accesses, but not unsecured and nonprivileged types of accesses, may be included in the set of allowable requests. In other embodiments, the privileged, secured, and unsecured types of accesses, but not the non-privileged type of accesses, may be included in the set of allowable requests. Thus, the set of test requests STR corresponds to requests that the security system 104 is authorizing for access to the secure asset 102 based on a current security level of the security system 104, whereas the set of allowable requests corresponds to requests that may be authorized if the security system 104 is operating in a desired manner (e.g., at the highest security level).

The efficacy decoder 112 may be further configured to receive the set of test requests STR from the security system 104. Further, the efficacy decoder 112 may be configured to compare the set of test requests STR with the set of allowable requests and determine the efficacy value EV for the security system 104 based on the comparison between the set of test requests STR and the set of allowable requests. In other words, the efficacy decoder 112 may be further configured to compare the plurality of test variables of each of the set of test requests STR with the plurality of allowable variables of each of the set of allowable requests. The efficacy value EV may be determined based on the comparison between the plurality of test variables of each of the set of test requests STR and the plurality of allowable variables of each of the set of allowable requests.

The efficacy value EV may be indicative of the security level of the security system 104 operating in the first functional state. In an embodiment, based on a match between a test request and an allowable request, the efficacy decoder 112 may be further configured to increase a count value (not shown). Further, the efficacy value EV may be determined as a ratio between the count value and a count of the set of test requests STR. Thus, the efficacy value EV is the highest when the set of test requests STR matches the set of allowable requests. Further, the efficacy decoder 112 may be configured to provide the efficacy value EV to the system controller 108.

Thus, the security system 104 is tested by comparing the set of test requests STR, that the security system 104 is currently authorizing for access to the secure asset 102, with the set of allowable requests that may be authorized if the countermeasure (e.g., the security system 104) is operating in the desired manner. Hence, when the security system 104 is operating in the desired manner, the set of allowable requests and the set of test requests STR may be identical. In an example, the efficacy value EV of one indicates that the security system 104 is uncompromised. Conversely, a lower efficacy value EV (e.g., less than the threshold value) indicates that the security system 104 is compromised and various recovery operations may be performed to recover the security system 104. In the above example, the threshold value may correspond to 0.4. However, the threshold value may be different in other embodiments. The security system 104 may be tested for each remaining functional state of the plurality of functional states in a similar manner as described above. The testing of the security system 104 ensures that the secure asset 102 is not compromised and the security threats to the IC 100 are mitigated.

Although FIG. 1 describes the testing of a single security system (e.g., the security system 104) of the IC 100, the scope of the present disclosure is not limited to it. In various other embodiments, the IC 100 may include multiple security systems controlling access to multiple secure assets and each security system may be tested in a similar manner as described above.

Figure 2A:
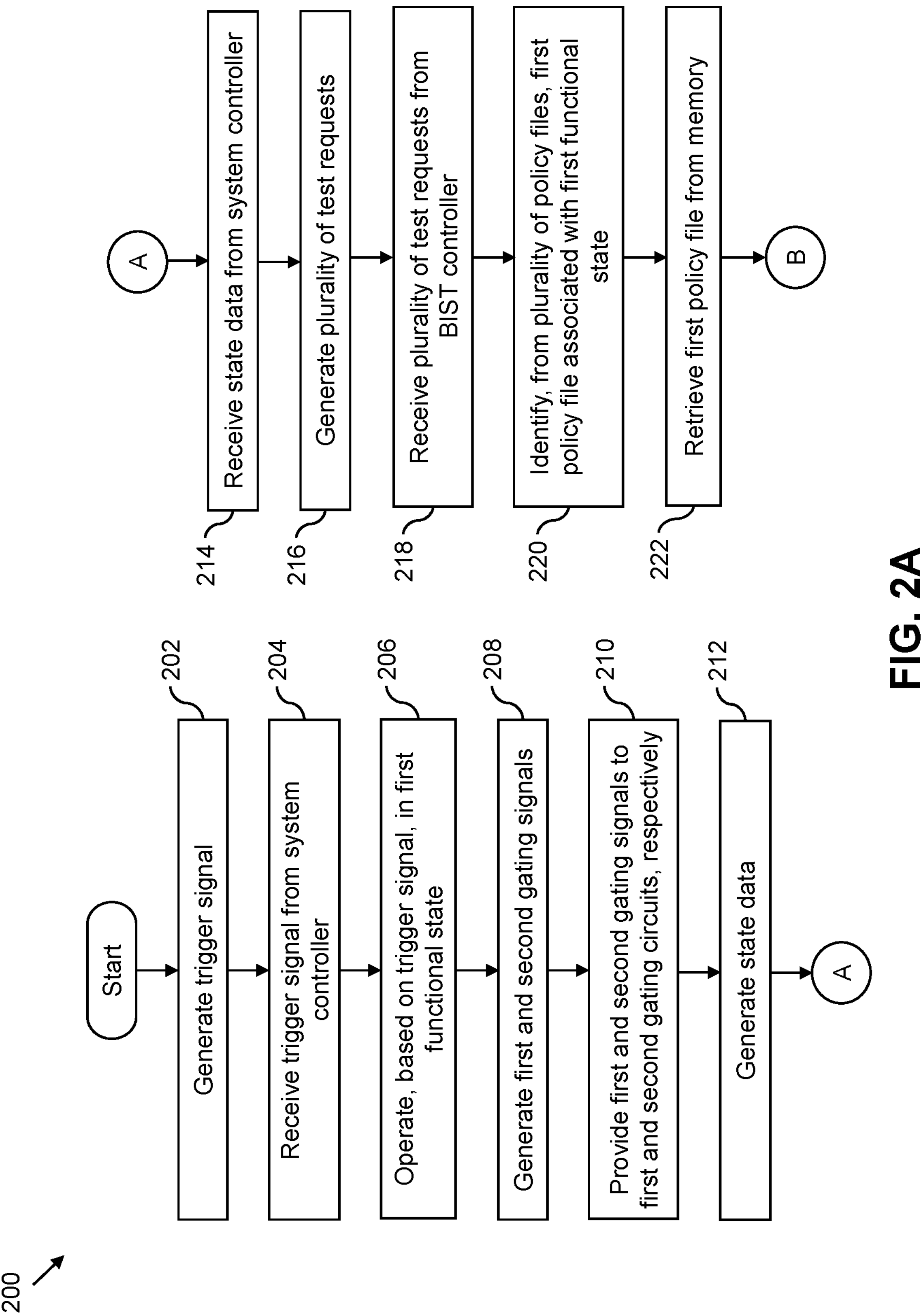
Figure 2B:
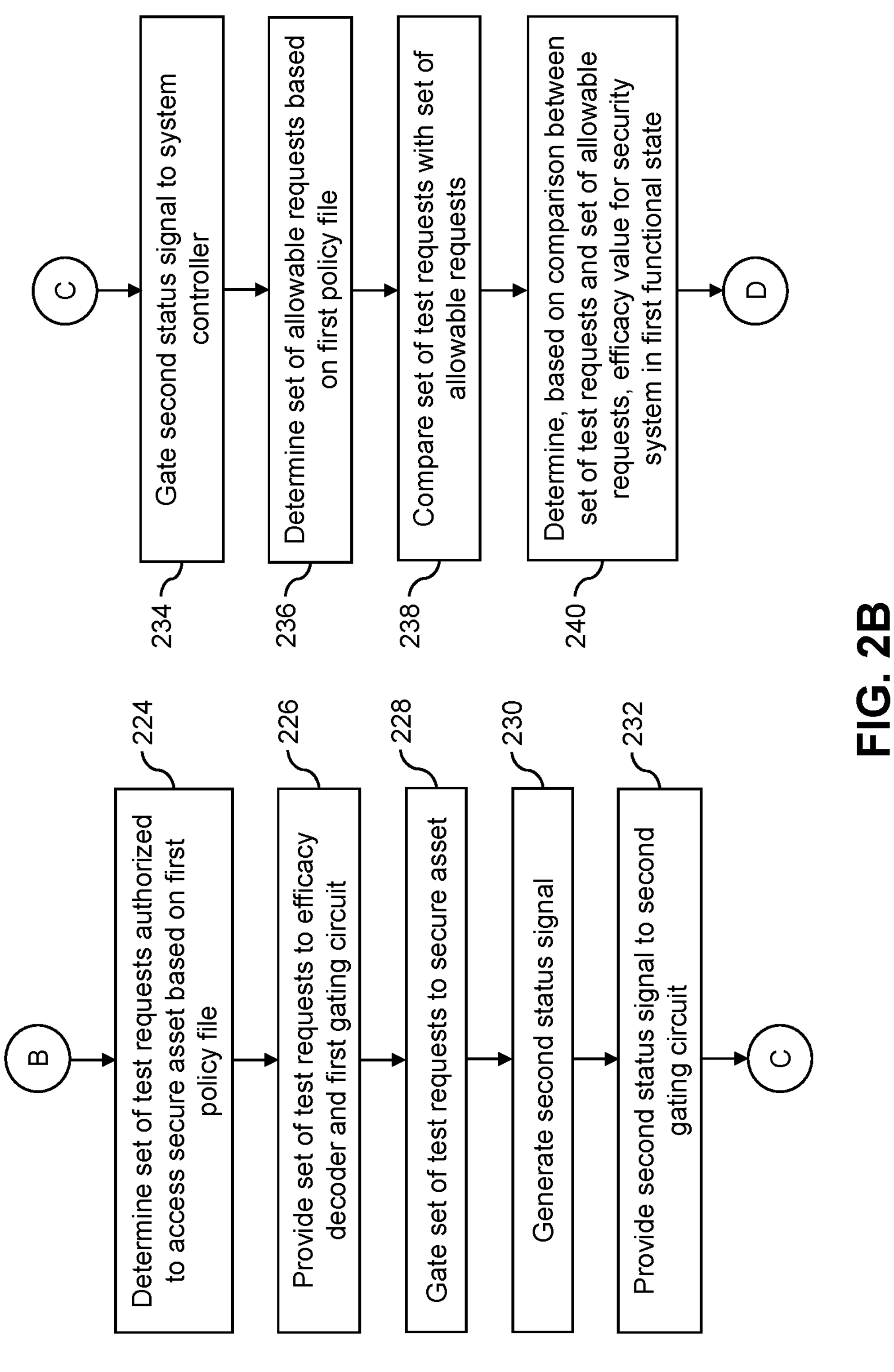

FIGS. 2A-2C, collectively, represents a flowchart 200 that illustrates a testing method of the security system 104 in accordance with an embodiment of the present disclosure. The testing of the security system 104 corresponds to triggering the security system 104 to operate in various functional states and determining whether the security system 104 is operating in the desired manner (e.g., is granting access exclusively to desired functional circuits) in each functional state.

Referring to FIG. 2A, at step 202, the system controller 108 may generate the trigger signal TR to trigger the security system 104 to operate in the first functional state. The system controller 108 thus initiates the testing of the security system 104. At step 204, the security system 104 may receive the trigger signal TR from the system controller 108. Further, at step 206, the security system 104 may operate in the first functional state based on the trigger signal TR. At step 208, the system controller 108 may generate the first and second gating signals GS1 and GS2. The first and second gating signals GS1 and GS2 may be at a logic high state. At step 210, the system controller 108 may provide the first and second gating signals GS1 and GS2 to the first and second gating circuits 114 and 116, respectively. The first and second gating circuits 114 and 116 may thus be activated. At step 212, the system controller 108 may generate the state data SD. The state data SD may indicate that the security system 104 is operating in the first functional state. At step 214, the efficacy decoder 112 and the BIST controller 110 may receive the state data SD from the system controller 108.

At step 216, the BIST controller 110 may generate the plurality of test requests PTR. The BIST controller 110 may generate the plurality of test requests PTR based on the state data SD and the configuration of the IC 100. At step 218, the security system 104 and the efficacy decoder 112 may receive the plurality of test requests PTR from the BIST controller 110.

Further, at step 220, the security system 104 and the efficacy decoder 112 may identify, from the plurality of policy files PF1-PF9, the first policy file PF1 associated with the first functional state. At step 222, the security system 104 and the efficacy decoder 112 may retrieve the first policy file PF1 from the memory 106.

Referring to FIG. 2B, at step 224, the security system 104 may determine, from the plurality of test requests PTR, the set of test requests STR authorized to access the secure asset 102 based on the first policy file PF1. At step 226, the security system 104 may provide the set of test requests STR to the efficacy decoder 112 and the first gating circuit 114. At step 228, the first gating circuit 114 may gate the set of test requests STR to the secure asset 102.

At step 230, the security system 104 may generate the second status signal SS2. Further, at step 232, the security system 104 may provide the second status signal SS2 to the second gating circuit 116. At step 234, the second gating circuit 116 may gate the second status signal SS2 to the system controller 108. At step 236, the efficacy decoder 112 may determine, from the plurality of test requests PTR, the set of allowable requests for the first functional state based on the first policy file PF1. Further, at step 238, the efficacy decoder 112 may compare the set of test requests STR with the set of allowable requests. Consequently, at step 240, the efficacy decoder 112 may determine, based on the comparison between the set of test requests STR and the set of allowable requests, the efficacy value EV for the security system 104 in the first functional state.

Referring to FIG. 2C, at step 242, the efficacy decoder 112 may provide the efficacy value EV to the system controller 108. At step 244, the system controller 108 may determine whether the efficacy value EV is less than the threshold value. If at step 244, it is determined that the efficacy value EV is greater than or equal to the threshold value, it may be inferred that the security system 104 is not compromised and no recovery operation may be executed on the security system 104. In such a scenario, the security system 104 may be tested for another functional state. If at step 244, it is determined that the efficacy value EV is less than the threshold value, step 246 is performed. At step 246, the system controller 108 may execute the recovery operation on the security system 104.

Therefore, in the present disclosure, the security level (e.g., the efficacy value EV) of the security system 104 is monitored during runtime by testing the security system 104. Further, the security level of the security system 104 is maintained within a desired range by performing various recovery operations thereon. Thus, unauthorized accesses to the secure asset 102 are prevented. The security threats to the IC 100 are thus significantly less than that to an IC including a conventional security system. Consequently, the reliability of the IC 100 is significantly greater than that of the IC including the conventional security system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as “first” and “second” are used to arbitrarily distinguish between the elements such terms describe. Thus, these terms are not necessarily intended to indicate temporal or other prioritization of such elements.

We claim:

1. An integrated circuit (IC), comprising:

a secure asset having a secure memory to store security data;

a security system coupled to the secure asset, wherein the security system including a circuit that is configured to (i) receive a plurality of test requests for access to the secure asset and (ii) determine a set of test requests of the plurality of test requests that is authorized by the security system to access the secure asset, the determination being based on state data indicating a first functional state of the security system, a gating circuit coupled between the security system and the secure asset, and configured to control access to the secure asset based on the set of test requests;

an efficacy decoder coupled to the security system, wherein the efficacy decoder includes a circuit that is configured to (i) determine a set of allowable requests for the first functional state, the set of allowable requests being requests authorized by the security system to access the secure asset when the security system operates at a predetermined security level, wherein the set of allowable requests determined from the plurality of test requests based on the state data indicating the first functional state, and (ii) determine an efficacy value for the security system based on a ratio of the set of test requests that is authorized by the security system and the set of allowable requests, wherein the efficacy value is indicative of a security level of the security system operating in the first functional state; and a system controller, the system controller including a circuit that is configured to perform a reset of at least a portion of the IC to gate access to the secure asset, based on the efficacy value being less than a threshold amount wherein the gating circuit is arranged to receive the set of test requests and to gate the set of test requests to prevent access to the secure asset, and wherein the gating circuit is not arranged to receive the set of allowable requests.

2. The IC of claim 1, wherein the security system is further configured to receive a trigger signal indicative of the first functional state, and wherein based on the trigger signal, the security system is further configured to operate in the first functional state.

3. The IC of claim 2, wherein the system controller coupled to the security system, and the system controller is configured to generate the trigger signal and provide the trigger signal to the security system to trigger the security system to operate in the first functional state based on determining the security level of the security system is in the first functional state.

4. The IC of claim 1, wherein the access to the secure asset corresponds to an access to the security data stored in the secure memory.

5. A testing method, comprising:

receiving, by a security system, a plurality of test requests for an access to a secure asset having a secure memory to store security data, the security system coupled to the secure asset and access to the secure asset is controlled by a gating circuit coupled between the security system and the secure asset;

determining, by the security system, a set of test requests of the plurality of test requests that the security system authorizes to access the secure asset based on state data indicating a first functional state of the security system, wherein the gating circuit controls the authorized access based on the set of test requests;

determining, by an efficacy decoder, a set of allowable requests for the first functional state, the set of allowable requests being requests authorized by the security system to access the secure asset when the security system operates at a predetermined security level, wherein the set of allowable requests determined from the plurality of test requests based on the state data indicating the first functional state;

determining, by the efficacy decoder, an efficacy value for the security system based on a ratio of the set of test requests that is authorized by the security system and the set of allowable requests, wherein the efficacy value is indicative of a security level of the security system operating in the first functional state; and performing, by a system controller, a reset of at least a portion of an integrated circuit (IC) to gate access to the secure asset based on the efficacy value being less than a threshold amount, wherein the gating circuit is arranged to receive the set of test requests and to gate the set of test requests to prevent access to the secure asset, and wherein the gating circuit is not arranged to receive the set of allowable requests.

6. The testing method of claim 5, further comprising:

receiving, by the security system, a trigger signal indicative of the first functional state; and operating, by the security system, based on the trigger signal, in the first functional state.

* * * * *